United States Patent [19]

Close et al.

[11] 3,829,619

[45] Aug. 13, 1974

[54] TELEPHONE RING TRIP CIRCUIT

[75] Inventors: Stanley Wayne Close, Penfield; John J. Cordovani; William E. Shaffer, both of Rochester, all of N.Y.

[73] Assignee: Stromberg-Carlson Corporation, Rochester, N.Y.

[22] Filed: Dec. 29, 1972

[21] Appl. No.: 319,242

[52] U.S. Cl. .......................... 179/18 HB, 179/84 A

[51] Int. Cl. .......................................... H04m 3/04

[58] Field of Search ........... 179/18 HB, 84 A, 84 L; 317/33 R

[56] References Cited

UNITED STATES PATENTS

| | | | |
|---|---|---|---|
| 3,417,293 | 12/1968 | Peaslee et al. | 317/33 R |
| 3,746,798 | 7/1973 | Thomas | 179/18 HB |

*Primary Examiner*—Kathleen H. Claffy
*Assistant Examiner*—Mitchell Saffian
*Attorney, Agent, or Firm*—William F. Porter, Jr.

[57] ABSTRACT

A telephone ring trip circuit utilizes a pair of unidirectional current detectors poled opposite one another in a parallel arrangement which is in series with a ringing path for providing signals proportional to the currents therethrough and a pair of integrating circuits in combination with other circuitry responsive to the signals for generating a ring trip control signal when DC current flows through the path upon answering of the call.

6 Claims, 2 Drawing Figures

PATENTED AUG 1 3 1974 3,829,619

SHEET 1 OF 2

TELEPHONE RING TRIP CIRCUIT

BACKGROUND OF THE INVENTION

The present invention pertains to telephone ring trip circuits and in particular to a ring trip circuit designed to function properly even under heavy ringing load conditions.

Ring trip circuits, as is well known, are used in telephone systems for detecting when a telephone call is answered in order to provide a signal for disconnecting the ringing signal generator from the telephone line at that time. It is important that the ringing generator be removed quickly when the call is answered before a telephone subscriber has had time to place the telephone handset to his ear since application of the ringing signal to the telephone receiver can produce a loud audible signal which is at least annoying and may also perhaps cause damage to the auditory sense. Until a call is answered only an AC signal, such as the ringing signal, can flow between the telephone switching system and the telephone instrument connected to the telephone line. Once a call is answered by lifting of the telephone handset a loop is completed through the telephone instrument for the flow of DC current from a battery usually connected in series with the ringing generator and the telephone line. It is the flow of this DC current which provides an indication that the call has been answered.

The ring trip circuit which is connected between the ringing generator and the telephone line being rung is ideally designed to be responsive to DC current but not the AC ringing signal. Consequently, the DC current detection device in the ring trip circuit which is customarily an electromagnetic relay is actuated only by the DC current when a telephone call is answered to provide the necessary control supervision for disconnecting the ringing generator from the telephone line at that time (commonly referred to as ring trip) and for initiating the interconnection of the calling and called parties immediately thereafter. Unfortunately, with present designs the ring trip relay is sometimes operated improperly before a telephone call is answered. As a result the ringing signal is terminated prematurely, sometimes very quickly so that the called party may not even have heard the ring, or if the signal was heard before termination, the called party may think that the call was intentionally abandoned and not bother to answer it. In either case, this is a highly undesirable situation since it confuses and inconveniences telephone customers and in addition unnecessarily burdens the telephone switching system since equipment previously used must be used once again if the caller wishes to reach the called party. Once the ringing signal is terminated, it can only be reestablished by dialing the same telephone number again.

The foregoing problem, commonly referred to as premature ring trip, is caused quite often by the connection of multiple telephone instruments to a single telephone line so that the ringing signal applied to the line actuates more than one signalling device such as a ringer. The simultaneous operation of a number of signalling devices creates heavy ringing loads sometimes drawing AC ringing current which exceeds the level above which the ring trip relay is no longer insensitive so that the relay is actuated thereby. It would therefore be highly desirable to provide a ring trip circuit which is not subject to premature ring trip even under heavy ringing load conditions.

Another problem encountered not only in ring trip circuits but in the telephone art generally is the integration of new solid state logic and switching circuits in circuit design employing established proven electromechanical devices such as, the electromagnetic ring trip relay previously alluded to. The continuing use of electromagnetic relays prevents taking full advantage of the miniaturization and cost savings afforded by total solid state circuitry since these relays occupy substantially greater space and cost more than equivalent electronic devices particularly with regard to mass production manufacturing and assembly costs associated with printed circuit cards which are now very popular in the telephone industry. Accordingly, it would be highly desirable to replace the standard ring trip relay with a solid state electronic device having the requisite characteristics such as high speed operation for responding to a DC current flow in a telephone line with a control signal for use in the switching equipment and which exhibits electrical isolation from the telephone line so that high voltage transients in the line cannot damage sensitive solid state components in the switching equipment control circuitry.

With the foregoing in mind, it is an object of the present invention to provide a new and improved telephone ring trip circuit.

It is a further object of the present invention to provide a new and improved ring trip circuit designed to function even under heavy ringing loads without the occurrence of premature ring trip.

It is still a further object of the present invention to provide a new and improved ring trip circuit which employs only solid state devices for DC current detection for initiating ring trip in response thereto.

The invention in accordance with these objects may be best understood by referring to the detailed description of the invention below together with the two drawings wherein FIG. 1 shows a block diagram of the ring trip circuit of the invention as it would be connected between the ringing generator and the telephone switching equipment for interconnecting the same to a telephone line which is to be rung and FIG. 2 which shows the schematic details of one embodiment of the ring trip circuit.

BRIEF DESCRIPTION OF THE INVENTION

The ring trip circuit of the invention utilizes a pair of unidirectional current detectors poled opposite one another and connected in parallel with each other and in series with a ringing path for providing signals proportional to the currents therethrough. The signals are applied to a comparator circuit through a pair of integrating circuits which tend to smooth out the signals so that with the passage of time there is essentially no difference in magnitude in the comparator input signals and consequently the comparator generates little if any output signal. A threshold circuit connected to the output of the comparator circuit having a threshold level greater than the maximum comparator output attainable as a result of the ringing signal only (which will occur during the first cycle of each ringing period) provides the ring trip control signal while preventing premature ring trip. The DC current flow through the telephone line when the call is answered renders one detector more conductive than previously and the other detector less conductive than previously thereby unbalancing the output signals from the integrating circuits sufficiently to cause the comparator output to exceed the threshold level so that the threshold circuit is triggered into generating the ring trip control signal at its output.

In the specific embodiment described each current detector is an optoelectronic coupler having its light emitting diode connected in the ringing path and its photosensitive transistor connected to one of the integrating circuits. Each integrating circuit comprises a capacitor-resistor charging circuit with the output signal being taken across the capacitor.

DETAILED DESCRIPTION OF THE INVENTION

Figure 1:
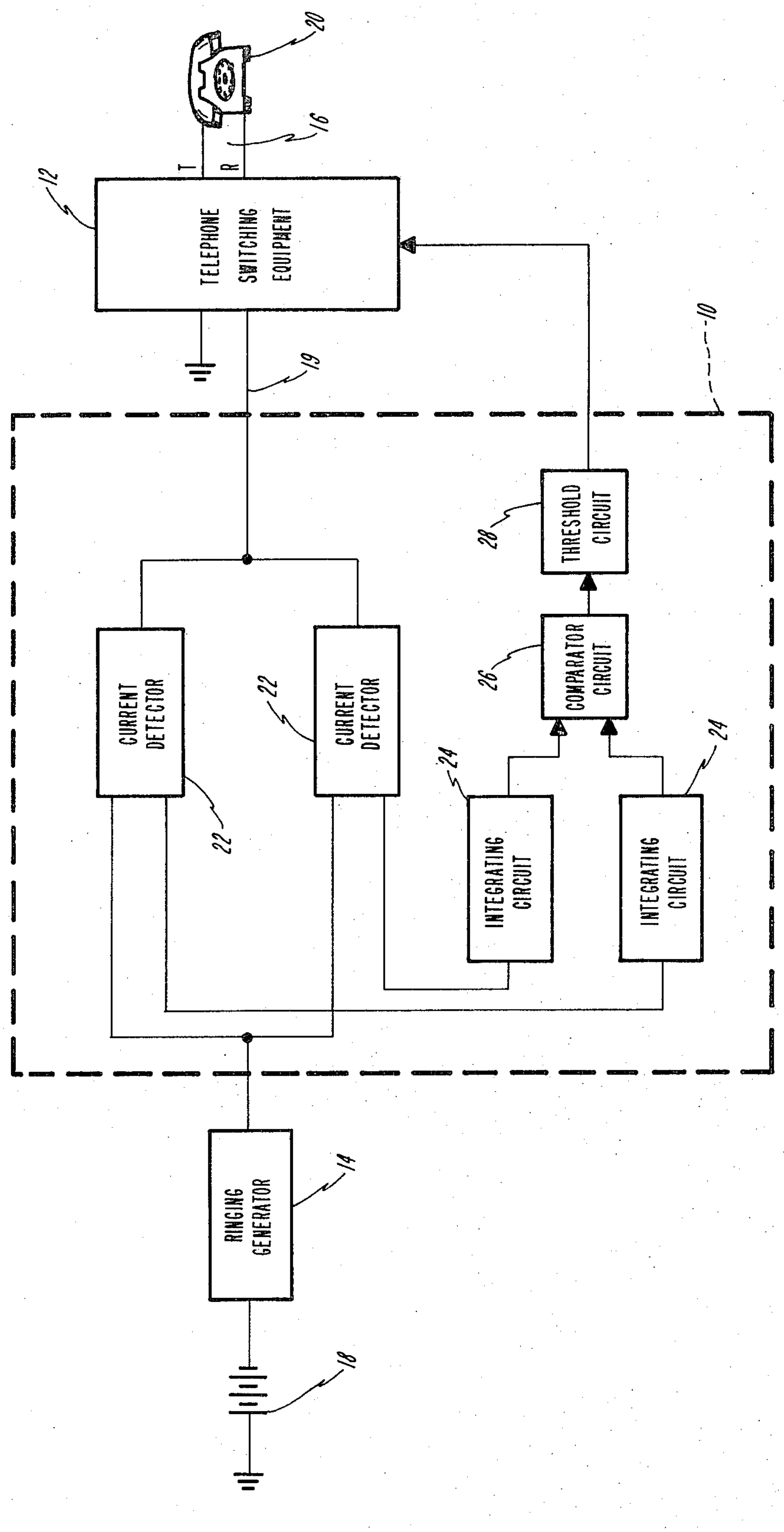

FIG. 1 shows in block form the ring trip circuit 10 of the invention connected between the telephone switching equipment 12 and a ringing generator 14. The ringing signal, consisting of a periodically interrupted AC voltage is applied to a telephone line which is to be rung, such as 16, through the telephone switching equipment 12 and a battery 18 which has one terminal, normally its positive, connected to ground. The switching equipment 12, in a well known manner, effectuates a connection between the telephone line 16 and the ringing generator 14 via lead 19 to permit ringing to take place. In all cases the ringing signal is applied to one or the other of the tip and ring conductors, T and R respectively, which form the telephone line 16 and which is connected to lead 19. In the case of divided ringing, the return path for the ringing signal is provided by earth ground via the ringer in the telephone set 20 connected to the conductor (T or R) over which the ringing signal is applied. In the case of bridged ringing the return path for the ringing signal is provided by the second conductor in the telephone line 16 which is always connected to ground during ringing through the telephone switching equipment 12. In either case, the flow of DC current through the telephone line 16 during ringing is blocked by some device such as a capacitor which is placed in series with the ringer which provides the only current path at this time through the telephone set 20. When the called party responds to the ringing signal by lifting the handset of the telephone set 20, a path for the flow of DC current through the handset is completed by operation of the released hookswitch. The DC current is detected in the ring trip circuit 10 which then applies a control signal to the switching equipment 12 to initiate the disconnection (ring trip) of the ringing generator 14 and the ring trip circuit 10 from the telephone line 16. Immediately thereafter the switching equipment 12 interconnects the telephone lines of the calling and called parties.

The ring trip circuit 10 comprises a pair of unidirectional current detectors 22 connected in parallel with each other and in series with the ringing path, each of which produces an output signal proportional to the current therethrough. Since these are unidirectional current devices, one current detector 22 responds to current during the first half of the AC cycle during ringing, while the other current detector 22 responds to current during the other half of the AC cycle. Since both current detectors 22 have equivalent characteristics and since the magnitude of AC ringing current is the same during each half of the AC cycle, the output signals from the current detectors 22 will be of the same magnitude but occur at different points in time. EAch output signal is applied to an integrating circuit 24 which integrates the output signal during each conductive half cycle to provide a smoothing effect which substantially eliminates the time difference betwenen the two signals after the passage of several cycles. Consequently, the two signals developed by the integrating circuits 24, at that time, are essentially equal in response to the AC ringing signal so that if applied to a comparator circuit 26 which generates an output signal proportional to the difference in magnitude between any two input signals applied thereto, little if any output signal from the comparator circuit 26 will be generated. The integrating circuit 24 also prevents transients in the telephone line 16 from falsely terminating the ringing signal. The current detectors 22 are designed to have rapid response time and provide electrical isolation between the telephone line 16 and all equipment connected to their output circuits.

When the called party responds to the ringing signal by lifting the handset of the telephone set 20 a path for the flow of DC current is provided via one or the other of the detectors 22. Since the detectors 22 are unidirectional current devices only that one which is properly poled will permit DC current to flow from the battery 18 through the telephone line 16 being biased for greater conductivity then before while the other will block DC current flow and be biased for less conductivity than before. As a result of this unbalance the output signal from the more conductive detector 22 will increase while the signal from the other detector 22 will decrease causing the difference in signals developed by the integrating circuit 24 to increase with time until the comparator circuit 26 generates an output signal significantly greater then the signal generated during the ringing condition in the absence of a DC current. If the output of the comparator circuit 26 is applied to a threshold circuit 28, such as a Schmitt trigger, which is only actuated in response to some minimum signal level applied to its input (commonly referred to as the threshold level), the output of the threshold circuit 28 can be used to provide a control signal to the switching equipment 12 for initiating ring trip by recognizing and responding to the presence of a DC current flow when the call is answered. By setting the threshold level above the maximum signal attainable from the comparator circuit 26 during ringing in the absence of DC current, (which will occur during the first cycle of each AC ringing period) the threshold circuit 28 is made to be insensitive to the AC condition which results in no output control signal therefrom. On the other hand, if the threshold level is set below the minimum signal attainable from the comparator circuit 26 in the presence of DC current the threshold circuit 28 is made to always respond properly to a ring trip condition by producing an output signal. There is a sufficient spread between the maximum comparator output signal during ringing and the minimum comparator output signal when the call is answered even under heavy ringing load conditions to provide a suitable threshold level to prevent premature ring trip. And this is true whether the call is answered during a ringing period (presence of AC voltage) or during a silent period in between (absence of AC voltage).

Figure 2:
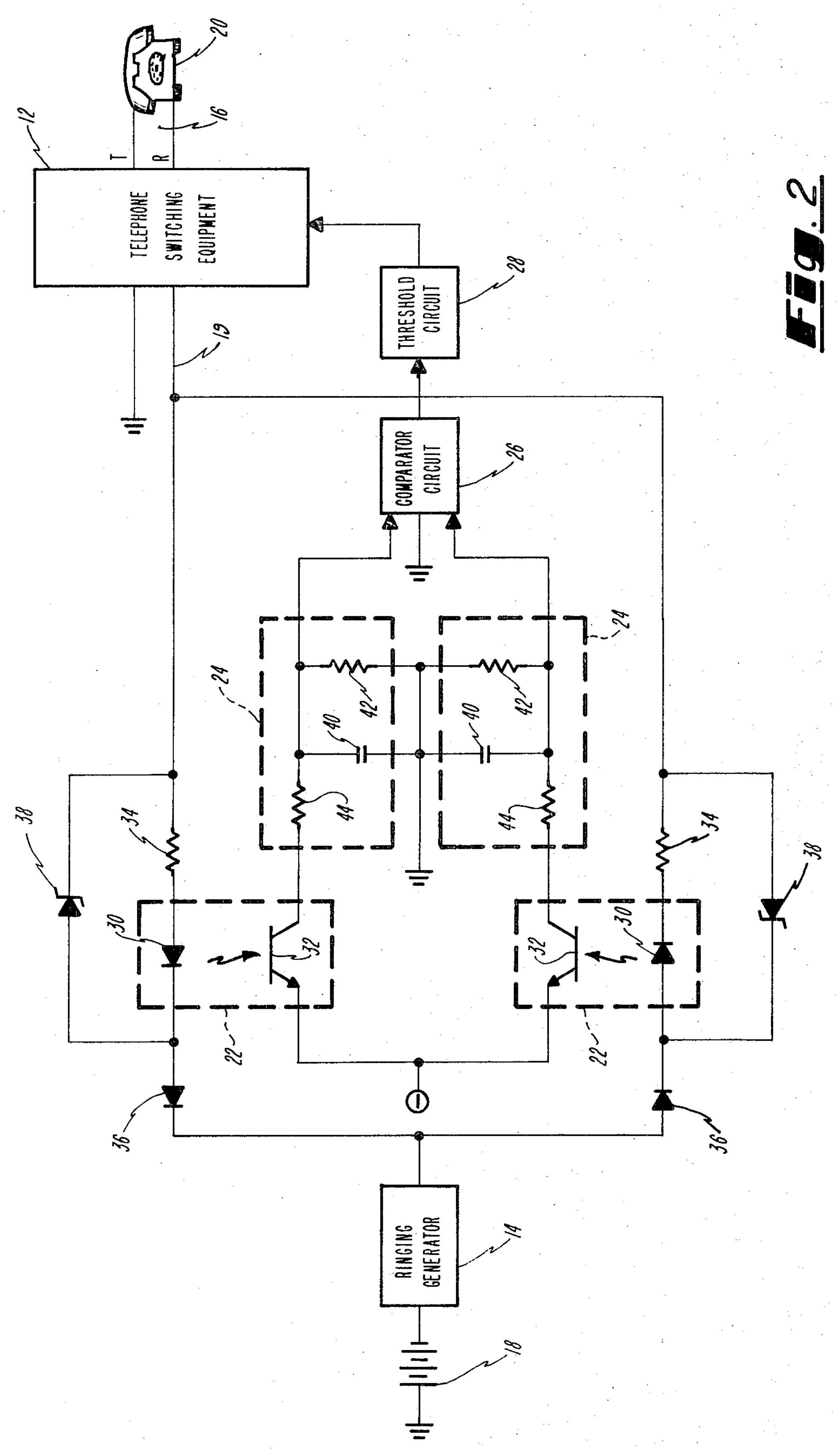

FIG. 2 shows the schematic details for a specific embodiment of the current detectors 22 and the integrating circuits 24 which comprise the ring trip circuit 10. No details for the comparator circuit 26 and threshold circuit 28 are necessary since these are devices well known to those familiar with the art. Each current detector 22 is a unidirectional solid state device such as an optoelectronic coupler comprising a light emitting diode 30 and a photosensitive transistor 32 optically coupled so that the latter is rendered conductive by radiation applied to its open circuited base by the light emitting diode 30 when current flows therethrough. The greater the radiation the more conductive the transistor 32 becomes. The optoelectronic coupler 28 is a well known electronic device whose characteristics may be referred to in a number of sources including an article in the June 28, 1963 edition of "Electronics Magazine" at pages 32–34 entitled, "Look At What Optical Semiconductors Do Now" by Richard F. Wolff. These devices are fast operating in the order of microseconds and provide a minimum of 150 volts insulation between the light emitting diode 30 and the pbotosensitive transistor 32. Each of the light emitting diodes 30 is connected between the line to be rung via lead 19 and the ringing generator 14 through a resistor 34 and a diode 36 which is designed to protect the light emitting diode 30 from large reverse voltages. A Zener diode 38 is placed across the series combination of the light emitting diode 30 and resistor 34 to function with the latter to prevent the current through the light emitting diode 30 from exceeding its allowable limit. When the current through the light emitting diode 30 reaches the maximum allowable, the resultant voltage across the Zener diode 38 (as determined primarily by the current through resistor 34) is sufficient to break it down so that any current in excess of the maximum passes through the Zener diode 38 and not the light emitting diode 30. As will be seen from FIG. 2, one of the light emitting diodes 30 is poled to conduct current through the telephone line 16 in one direction during one half of the AC cycle while the other light emitting diode 30 is poled to conduct current through the telephone line 16 in the opposite direction during the other half of the AC cycle.

The emitter of each photosensitive transistor 32 is connected to the negative terminal of a grounded DC supply while the collector is connected to an associated integrating circuit 24 which consists of a capacitor 40 connected in parallel with a leakage resistor 42 between ground and the collector through a charging resistor 44. The output signal from the integrating circuit 24 is taken across the capacitor 40 and applied to the comparator circuit 26 referenced to ground. During the application of the ringing signal to the telephone line 16 and prior to answering of the call the voltages developed across the capacitors 40 become essentially equal with respect to ground as time passes so that the comparator circuit 26 produces little if any output signal. As mentioned previously, the threshold lead of the threshold circuit 28 is set above the maximum comparator output during ringing in the absence of DC current, which will occur during the first cycle of each ringing period when one capacitor 40 will develop a potential and the other capacitor 40 has not yet done so. With each passing cycle the voltages developed by the capacitors 40 will be more and more alike at any point in time. During the half of the AC cycle that a transistor 32 is rendered conductive, its associated capacitor 40 charges up with a time constant determined by the values for resistors 42 and 44 while during the other half of the AC cycle, the capacitor 40 discharges through resistor 42. The input impedance to the comparator circuit 26 is designed to be large so that the discharge of capacitor 40 is primarily through resistor 42, the value of which can be judiciously selected so that the voltage developed across capacitor 40 during each AC ringing period is related to the average AC current during the conductive half cycle without permitting the capacitor to charge up to a sufficiently large voltage which might otherwise adversely affect the circuit operation when DC current is detected.

When a telephone call is answered, the resultant flow of DC current via the upper light emitting diode 30 in FIG. 2 renders its associated transistor 32 much more conductive than the other transistor 32 since the other light emitting diode 30 conducts substantially less current at this time irrespective of whether the call is answered during a ringing period or a silent period. Consequently, the voltages developed across the capacitors 40 as a result of the DC current flow when the call is answered will be significantly unbalanced causing the comparator circuit 26 to produce an output signal in excess of the threshold level of the threshold circuit 28 thereby initiating ring trip. The following values have been found to provide rapid response without premature ring trip:

| | |
|---|---|
| Telephone loop resistance | 0–1500 ohms |
| Number of ringers | 0–10 |
| AC Ringing Signal Frequency | 20–66 ⅔HZ |
| AC Ringing Signal RMS Voltage | 80–110 volts |
| DC Supply Voltage | 44–54 volts |
| Capacitor 40 | 250 microfarads |
| Resistor 42 | 7400 ohms |
| Resistor 44 | 2400 ohms |
| Resistor 34 | 100 ohms |
| Optoelectronic coupler | Motorola MOC 1000 |
| Zener Diode 38 | 1N4734A |

Thus the ring trip circuit of the invention is seen to provide assurance that premature ring trip will not occur even under heavy ringing loads. The current detectors used in the circuit, such as the optoelectronic couplers provide rapid response time and electrical isolation necessary for proper operation including preventing line transients from damaging sensitive solid state control circuitry. Furthermore, the use of solid state current detectors in lieu of electromagnetic relays permits full realization of the space and cost savings to be obtained from printed circuit card technology.

The specific embodiment disclosed herein is intended to be merely illustrative and not restrictive of the invention since various modifications readily apparent to those familiar with the art can be made without departing from the scope and spirit of the invention as claimed hereinbelow.

What is claimed is:

1. A telephone ring trip circuit comprising:

a pair of current detectors, each having a unidirectional current path input circuit and an output circuit electrically isolated therefrom which is energized from a DC source, wherein the conductivity state of said output circuit is proportional to the current through its associated input circuit;

circuit means for connecting both of said input circuits in parallel with each other and in series with a telephone ringing path arranged so that each is poled for conducting current in a direction opposite to that of the other;

a pair of integrating circuits, each being connected to an output circuit of one of said current detectors, for developing a signal which is substantially related to the integral of the time function of the current therethrough;

a comparator circuit responsive to said signals for generating a monitor signal proportional to the magnitude difference therebetween, and a threshold circuit connected to said comparator circuit for generating a control signal when said monitor signal exceeds a predetermined value.

2. The ring trip circuit of claim 1 wherein said predetermined value corresponds to the maximum magnitude difference attainable when the ringing signal is present in the absence of any DC current flow.

3. The ring trip circuit of claim 1 wherein said current detector is a solid state device whose input circuit radiates energy proportional to the current therethrough which is applied to its associated output circuit for controlling the conductivity state thereof.

4. The ring trip circuit of claim 3 wherein said current detector is an optoelectric coupler and said input circuit includes a light emitting diode thereof and said output circuit includes the collector-emitter path of a photosensitive transistor thereof.

5. The ring trip circuit of claim 4 wherein said circuit means includes an individual resistor and diode connected in series with each of said light emitting diodes and an individual Zener diode connected across the series combination of light emitting diode and resistor having a breakdown voltage equal to the voltage across said series combination at the maximum design current for said light emitting diode.

6. The ring trip circuit of claim 4 wherein each of said integrating circuits includes a capacitor connected in parallel with a leakage resistor, both being connected in series with the collector-emitter path of the associated current detector through a charging resistor whereby the signal applied to said comparator circuit is developed across said capacitor.

* * * * *